(12) United States Patent
Chien et al.

(10) Patent No.: US 9,791,657 B2
(45) Date of Patent: Oct. 17, 2017

(54) METHODS OF REMOVING COATING MATERIAL FROM OPTICAL FIBERS

(71) Applicant: Corning Optical Communications LLC, Hickory, NC (US)

(72) Inventors: Ching-Kee Chien, Horseheads, NY (US); Brandon Andrew Barnes, Ft. Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 56 days.

(21) Appl. No.: 14/723,567

(22) Filed: May 28, 2015

(65) Prior Publication Data

US 2015/0346452 A1 Dec. 3, 2015

(30) Foreign Application Priority Data

Jun. 2, 2014 (EP) ..................................... 14170795

(51) Int. Cl.
*G02B 6/38* (2006.01)
*G02B 6/44* (2006.01)
*G02B 6/245* (2006.01)

(52) U.S. Cl.
CPC .......... *G02B 6/4497* (2013.01); *G02B 6/245* (2013.01); *G02B 6/3825* (2013.01); *G02B 6/3861* (2013.01); *G02B 6/3873* (2013.01); *G02B 6/4433* (2013.01); *Y10S 156/923* (2013.01); *Y10T 156/1153* (2015.01)

(58) Field of Classification Search
CPC ... G02B 6/245; G02B 6/3861; Y10S 156/923; Y10T 156/1153
See application file for complete search history.

(56) References Cited

U.S. PATENT DOCUMENTS

| 3,861,781 | A | * | 1/1975 | Hasegawa | ............ | G02B 6/3855 |
| | | | | | | 385/60 |
| 4,925,266 | A | * | 5/1990 | Huebscher | ............. | G02B 6/245 |
| | | | | | | 385/78 |
| 5,948,202 | A | * | 9/1999 | Miller | .................... | G02B 6/125 |
| | | | | | | 156/708 |
| 5,968,283 | A | | 10/1999 | Walraven et al. | ............... | 134/19 |

(Continued)

FOREIGN PATENT DOCUMENTS

| FR | 2728735 A1 | 6/1996 | ............... H02G 1/12 |
| JP | 55181212 U | 12/1980 | ............... G02B 7/26 |

(Continued)

*Primary Examiner* — Mark A Osele
(74) *Attorney, Agent, or Firm* — Adam R. Weeks

(57) ABSTRACT

A method of removing a tight buffer coating from an optical fiber involves positioning an end section of the optical fiber next to an end of a tube, with at least a portion of the the end section including a primary coating and the tight buffer coating. The tube has an inner diameter greater than an outer diameter of the primary coating and an outer diameter less than an outer diameter of the tight buffer coating. The method also involves applying energy to heat the tight buffer coating, inserting the end section of the optical fiber into the tube so that the tight buffer coating contacts the end of the tube, and advancing the end section of the optical fiber along the tube. The tube removes the tight buffer coating from the primary coating as the end section of the optical fiber is advanced.

13 Claims, 7 Drawing Sheets

(56) References Cited

U.S. PATENT DOCUMENTS

| | | | |
|---|---|---|---|
| 8,317,972 B2 * | 11/2012 | Dunwoody | G02B 6/245 156/708 |
| 8,480,311 B2 | 7/2013 | Ohtsuka et al. | 385/78 |
| 8,696,215 B1 | 4/2014 | Fewkes et al. | |
| 8,844,602 B2 * | 9/2014 | Saito | G02B 6/245 156/701 |
| 9,151,895 B2 * | 10/2015 | Miller | G02B 6/245 |
| 2010/0220960 A1 | 9/2010 | Ohtsuka et al. | |

FOREIGN PATENT DOCUMENTS

| | | | | |
|---|---|---|---|---|
| JP | 2011002821 | | 1/2011 | G02B 6/00 |
| JP | 2012123235 A | | 6/2012 | G02B 6/38 |

\* cited by examiner

METHODS OF REMOVING COATING MATERIAL FROM OPTICAL FIBERS

PRIORITY APPLICATION

This application claims the benefit of priority under 35 U.S.C. §119 of European Patent Application Serial No. 14170795.0 filed on Jun. 2, 2014, the content of which is relied upon and incorporated herein by reference in its entirety.

BACKGROUND

The disclosure relates generally to optical fibers, and more particularly to methods of of removing coating material from one or more optical fibers, along with fiber optic connectors and cable assemblies related to such methods.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector or adapter, an optical fiber in the ferrule is positioned in a known, fixed location relative to the housing. This allows an optical connection to be established when the optical fiber is aligned with another optical fiber provided in the mating component (the other connector or adapter).

Ferrules bores typically have a size that is only slightly larger than a "bare" optical fiber to provide the fixed positional relationship mentioned above. The term "bare" is used because optical fibers, which may be glass or plastic, are normally surrounded by one or more protective coatings/layers. For example, many optical fibers are provided with a soft coating from acrylic directly on the optical fiber material (e.g., glass) for moisture protection. Furthermore, many of these "coated" optical fibers are surrounded by a tight buffer layer/coating from a harder plastic (e.g., PVC or polyolefin) to provide physical protection. With such tight buffered cables, removal of both the tight buffer coating and acrylic coating is typically required prior to inserting the optical fiber into a ferrule bore.

Both one-step removal processes (i.e., the tight buffer coating and acrylic coating being removed together) and two-step removal processes (i.e., the tight buffer coating and acrylic coating being removed separately) are known. These processes often involve mechanical stripping, but may additionally or alternatively involve chemical stripping, hot gas stripping, and laser stripping. Each of these techniques presents its own challenges. For example, mechanical stripping includes physically removing material from the optical fiber with a semi-sharp edge of one or more blades, which has the potential to damage the optical fiber and/or can require time-consuming inspection and replacement procedures for the blades. Chemical stripping uses chemicals to dissolve material intended to be removed, but the chemicals may require extensive safety measures and procedures to protect the environment. Hot-gas stripping uses a heated jet of gas (e.g., nitrogen or air) to melt and remove material, which can be difficult to control and may result in considerable debris. Laser stripping involves using one or more laser beams to vaporize or ablate material, but can require complex and expensive equipment to distribute the laser energy around the optical fiber in a desired manner.

In addition, once both the tight buffer coating and acrylic coating are removed from an end section of an optical fiber using any of the above-mentioned methods, the optical fiber may be vulnerable to damage. A stripped (i.e., bare) optical fiber may be damaged merely by being brought into contact with particulates, which may scratch or damage an exterior surface of the optical fiber where coating material has been removed. Any stripping process completed prior to insertion of the optical fiber into a ferrule must be managed carefully so that the stripped optical fiber is not damaged prior to being protected within the ferrule.

SUMMARY

Methods of removing a tight buffer coating from an optical fiber are disclosed. The tight buffer coating surrounds a primary coating on the optical fiber. According to one example, an end section of an optical fiber is positioned next to an end of a tube, with at least a portion of the the end section including the primary coating and the tight buffer coating. The tube has an inner diameter greater than an outer diameter of the primary coating and an outer diameter less than an outer diameter of the tight buffer coating. The method also involves applying energy to heat the tight buffer coating, inserting the end section of the optical fiber into the tube so that the tight buffer coating contacts the end of the tube, and advancing the end section of the optical fiber along the tube. The tube removes the tight buffer coating from the primary coating as the end section of the optical fiber is advanced.

The methods disclosed herein may be part of a process for forming a fiber optic cable assembly that does not involve conventional removal (i.e., stripping) techniques for both the tight buffer coating and primary coating of the optical fiber. According to another example, the tube mentioned above is part of a fiber optic connector that also includes a ferrule having a front end, a rear end, a ferrule bore extending between the front and rear ends, and a bonding agent disposed in at least a portion of the ferrule bore. The method mentioned above further involves applying energy to heat the bonding agent and advancing the end section of the optical fiber through the tube, into the ferrule bore, and through the bonding agent when the bonding agent is heated (i.e., in a heated state). The heated bonding agent thermally removes at least a portion of the primary coating when the end section of the optical fiber passes through the bonding agent. The optical fiber is then secured in the ferrule bore with the bonding agent Fiber optic connectors and fiber optic cable assemblies related to methods like those mentioned above are also disclosed. One example of a fiber optic connector includes a ferrule, a ferrule holder, and a tube. The ferrule has a front end, rear end, and ferrule bore extending between the front and rear ends. The ferrule holder has a first portion in which the rear end of the ferrule is received and a second portion opposite the first portion. The tube extends from the second portion of the ferrule holder and is hollow and in communication with the ferrule bore. Additionally, the tube has an inner diameter greater than an outer diameter of a primary coating that surrounds an optical fiber and an outer diameter less than an outer diameter of a tight buffer coating that surrounds the primary coating so that the tube is configured to remove the tight buffer coating from the primary coating upon insertion of the optical fiber into the tube.

One example of a fiber optic cable assembly includes the exemplary fiber optic connector mentioned above installed on a fiber optic cable that includes the optical fiber. Some of the tight buffer coating is removed from the primary coating and located on an outer surface of the tube.

Additional features and their advantages will be set forth in the detailed description which follows. Indeed, it is to be understood that both the foregoing summary and the following detailed description are merely exemplary and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
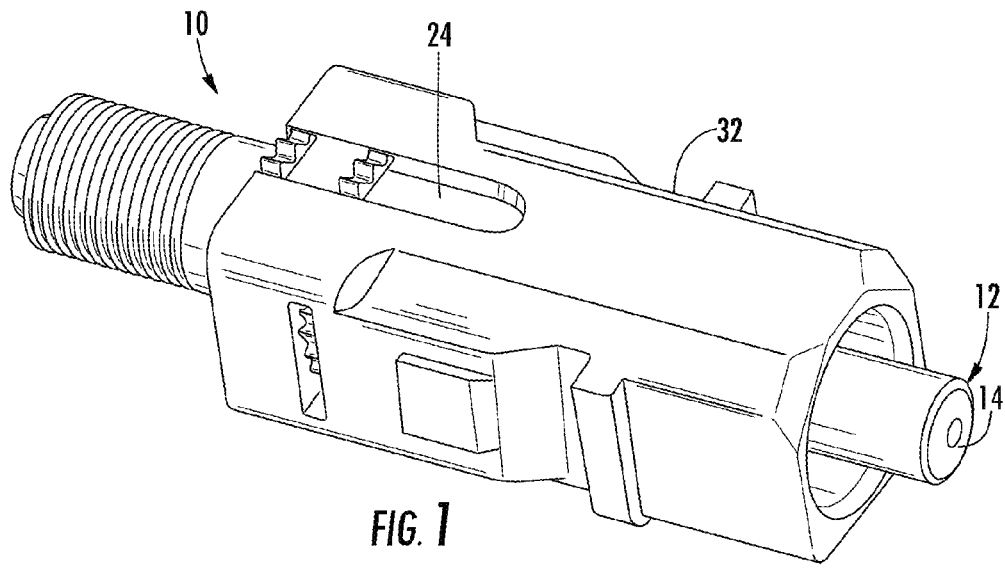
FIG. 1 a perspective view of an example of a fiber optic connector.

Various embodiments will be further clarified by examples in the description below. In general, the description relates to methods of removing a tight buffer coating from an optical fiber (i.e., one or more optical fibers) along with related fiber optic connectors and fiber optic cable assemblies. The methods may be part of a cable assembly process for a fiber optic cable. That is, the methods may be part of terminating one or more optical fibers from a fiber optic cable with a fiber optic connector to form a fiber optic cable assembly. One example of a fiber optic connector ("connector") 10 for such a fiber optic cable assembly is shown in FIG. 1. Although the connector 10 is shown in the form of a SC-type connector, the methods described below may be applicable to processes involving different connector designs. This includes ST, LC, FC, MU, and MPO-type connectors, for example, and other single-fiber or multi-fiber connector designs. A general overview of the connector 10 and an exemplary fiber optic cable will be provided simply to facilitate discussion.

Figure 2:
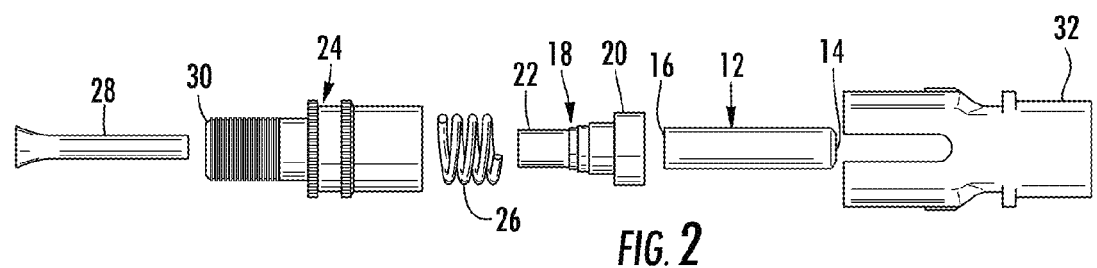
FIG. 2 is an exploded side view the fiber optic connector of FIG. 1.

As shown in FIGS. 1 and 2, the connector 10 includes a ferrule 12 having a front end 14 and rear end 16, a ferrule holder 18 having opposed first and second end portions 20, 22, and a housing 24 (also referred to as "inner housing 24", "retention body 24", "crimp body 24", or "connector body 24"). The rear end 14 of the ferrule 12 is received in the first end portion 20 of the ferrule holder 18 while the front end 14 remains outside the ferrule holder 18. The second end portion 22 of the ferrule holder 18 is received in the housing 24. A spring 26 may be disposed around the second end portion 22 and configured to interact with walls of the housing 24 to bias the ferrule holder 18 (and ferrule 12). Additionally, a lead-in tube 28 may extend from a rear end of the housing 24 to within the second end portion 22 of the ferrule holder 18 to help guide the insertion of an optical fiber (not shown in FIGS. 1 and 2) into the ferrule 12. An outer shroud 32 also referred to as an "outer housing") is positioned over the assembled ferrule 12, ferrule holder 18, and housing 24, with the overall configuration being such that the front end 16 of the ferrule 12 presents an endface configured to contact a mating component (e.g., another fiber optic connector; not shown).

In a manner not shown herein, a fiber optic cable providing the optical fiber also includes one or more layers of material (e.g., strength layer of aramid yarn) that may be crimped onto a rear end portion 30 of the housing 24, which is why the housing 24 may be referred to as a "crimp body". A crimp band may be provided for this purpose. Additionally, a strain-relieving boot may be placed over the crimped region and extend rearwardly to cover a portion of the fiber optic cable. Variations of these aspects will be appreciated by persons familiar with the design of fiber optic cable assemblies.

Figure 3:
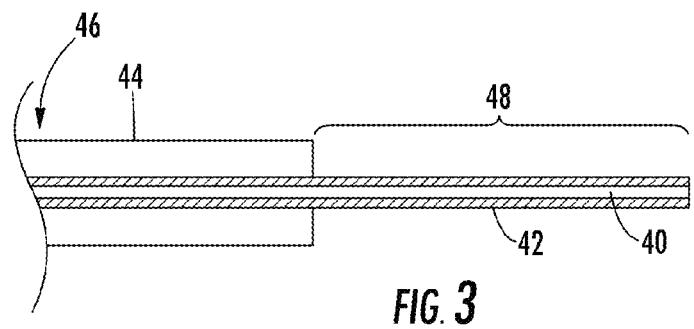
FIG. 3 is a schematic view of a portion of a fiber optic cable that includes an optical fiber, a primary coating applied to the optical fiber, and a tight buffer coating applied to the primary coating, with some of the tight buffer coating having been removed from an end section of the optical fiber and primary coating.

FIG. 3 schematically illustrates an example of an optical fiber 40 upon which the connector 10 may be installed. The optical fiber 40 guides light through a principle known as "total internal reflection," where light waves are contained within a core by a cladding that has a different index of refraction than the core. The core and cladding are not labeled in FIG. 3, but together define the optical fiber 40 and may comprise glass (e.g., germanium-doped silica). One or more coating layers surround the optical fiber 40 to protect the optical fiber 40 from the environment and mechanical loads. In the embodiment shown, a primary coating 42 surrounds the optical fiber 40, and a secondary coating 44 surrounds the primary coating 42. The primary coating 42 may be an acrylic polymer or the like and simply be referred to as "the coating". The secondary coating 44 may comprise polyvinyl chloride (PVC), polyurethane, polyolefin, or the like, and simply be referred to as a "tight buffer" or "tight buffer coating" (the latter term will be used herein). The optical fiber 40, primary coating 42, and tight buffer coating 44 represent part of a fiber optic cable 46 that may or may not include other optical fibers.

Typically the primary coating 42 and tight buffer coating 44 are removed from a section of the optical fiber 40 before installing a connector. In FIG. 3, the tight buffer coating 44 has been removed from the primary coating 42 over an end section 48 of the optical fiber 40. Methods for such removal will now be described.

To this end, FIGS. 4-7 schematically illustrate one example of these methods. The example involves a tube 50 that has a first end 52, second end 54, and passageway 56 extending between the first and second ends 52, 54 (i.e., the tube 50 is hollow). The tube 50 may be made from a variety of materials, but conductive materials such as metals (e.g., stainless steel) may provide some advantages in certain embodiments for reasons mentioned below. Although the tube 50 is shown as having a uniform cross-section/profile, in other embodiments there may be variations in geometry on an outer surface 58 and/or inner surface 60 of the tube 50.

Figure 4:
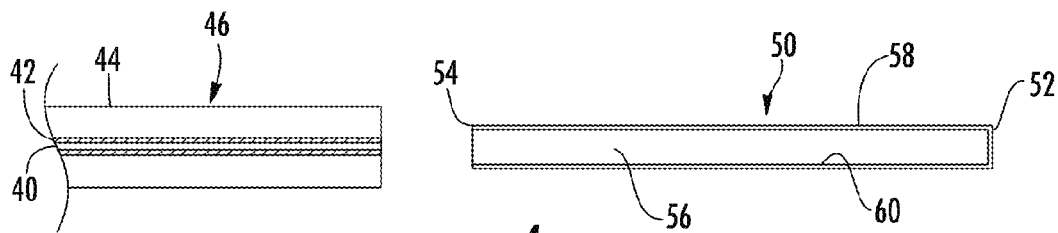
FIGS. 4-7 are schematic views sequentially illustrating one example of a method of removing the tight buffer coating from the primary coating of an optical fiber by inserting an end section of the optical fiber into a tube.
Figure 5:
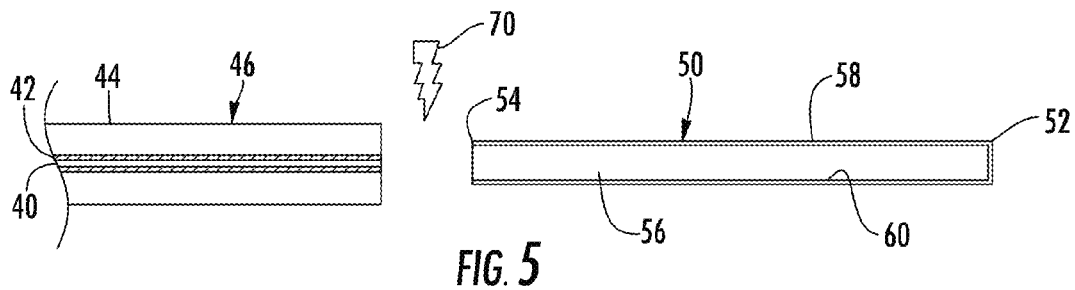

FIG. 4 shows an end section of the optical fiber 40 with the primary coating 42 and tight buffer 44 coating still present positioned next to the second end 54 of the tube 50. The optical fiber 40 is aligned or substantially aligned with the passageway 56. The tube 50 includes an inner diameter that is greater than an outer diameter of the primary coating 42 and an outer diameter that is less than an outer diameter of the tight buffer coating 44. For example, the inner diameter of the tube 50 may be between about 120% and about 170% of the outer diameter of the primary coating 42. This corresponds to between about 300 µm and about 425 µm for a 250 µm-diameter primary coating. Additionally, the outer diameter of the tube 50 may be between about 50% and 70% of the outer diameter of the tight buffer coating 44. This corresponds to between about 450 µm and about 630 µm for a 900-µm diameter tight buffer coating.

Before or after positioning the fiber optic cable 46 relative to the tube 50, energy is applied to heat the tight buffer coating 64. An energy source or heating device 70 is shown generically in FIG. 5 because different embodiments may use different sources (ovens, lasers, etc.) and techniques (convection, conduction, etc.) to heat the tight buffer coating 44 directly or indirectly. For example, the heating device 70 may be used to direct heat toward or around the tight buffer coating 44 in some embodiments. In other embodiments, the tube 50 may be heated such that the tight buffer coating 44 is heated indirectly upon contact with the tube 50 (contact is discussed below). Having a conductive tube in such embodiments may facilitate the heating process. For commonly used tight buffer coating materials, such as polyvinyl chloride (PVC), the tight buffer coating 44 may be heated to a temperature between about 60° C. and about 200° C. to soften the tight buffer coating 44 so that removal from the primary coating 42 is easier yet still avoid material degradation that might otherwise release potentially harmful gases.

Figure 6:
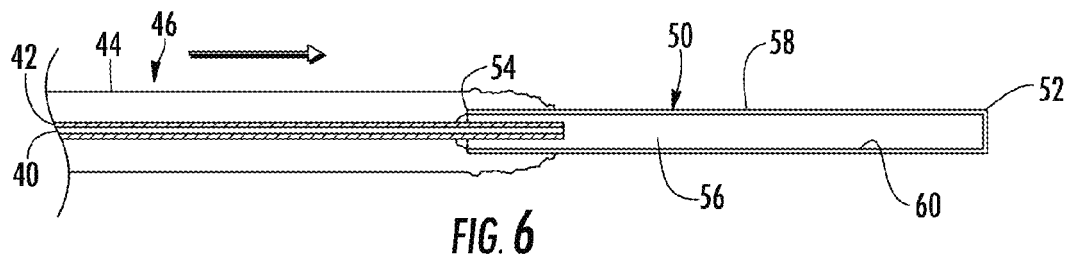
Figure 6A:
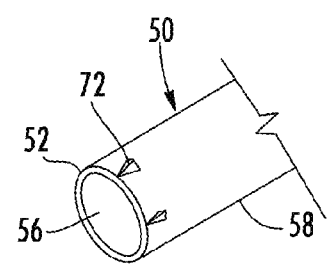
FIG. 6A schematically illustrates a blade on the tube used in the method of FIGS. 4-7 as an example of a removal feature to facilitate splitting the tight buffer coating during the method.

Now referring to FIG. 6, the end section of the optical fiber 40 is inserted into the second end 54 of the tube 50. The tight buffer coating 44 contacts the second end 54 of the tube 50 upon this insertion and separates from the primary coating 42. As the end section of the optical fiber 40 is advanced along the tube 50, the tight buffer coating 44 moves over the outer surface 58 of the tube 50 and begins to accumulate. Inserting and advancing the optical fiber 40 may be achieved manually, such as directly by hand or indirectly by a manually-operated device, or automatically, such as by a device with motors or other feed/drive mechanisms. One or more removal features 72 may be provided at or near the second end 54 of the tube 50 to facilitate removal of the tight buffer coating 44. FIG. 6A schematically illustrates a blade on the tube 50 for splitting the tight buffer coating 44 as an example of a removal feature 72.

Figure 7:
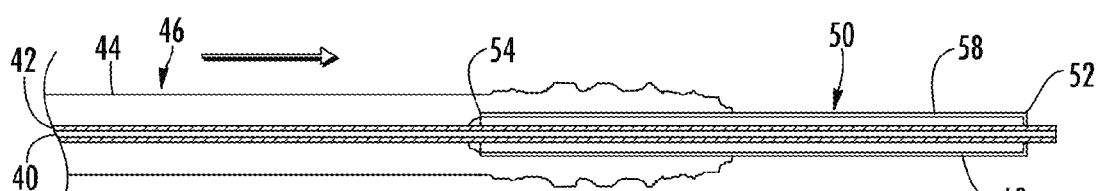
Figure 7A:
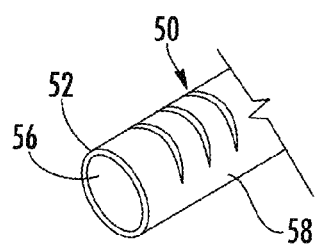
FIG. 7A schematically illustrates irregularities on an outer surface of the tube used in the method of FIGS. 4-7 as an example of a retention feature to help resist retraction of the tight buffer coating after performing the method.

As shown in FIG. 7, eventually the optical fiber 40 is advanced through the tube 50 so as to extend from the first end 52 with the primary coating 42 still present. In other words, a length of the end section of the optical fiber 40 with primary coating 42 is exposed. The tight buffer coating 44 that has been removed remains on the outer surface 58 of the tube 50, with the accumulation occurring only on a portion of the tube 50. One or more retention features 74 may be provided on the outer surface 58 to help resist retraction of the tight buffer coating 44 and thereby assist with strain relief for the fiber optic cable 46. FIG. 7A schematically illustrates irregularities or formations on the outer surface 58 as an example of a retention feature 74. Openings (e.g., windows) or projections (e.g., barbs) are other examples not shown herein.

Once the end section of the optical fiber 40 extends through the tube 50, the primary coating 42 may be removed from the end section using known techniques (e.g., mechanical stripping), and the optical fiber 40 may then be terminated with the connector 10 (FIGS. 1 and 2) to form a fiber optic cable assembly. Stated differently, a fiber optic connector may be installed onto the end section of the optical fiber 40 after removing the primary coating 42 in a conventional manner. In other embodiments, however, the tube 50 may be integrated into the fiber optic connector so that the tight buffer coating 44 is removed while putting together the fiber optic cable assembly. Such embodiments may involve novel and advantageous methods/techniques for removing the primary coating 42 to make this possible.

Figure 8:
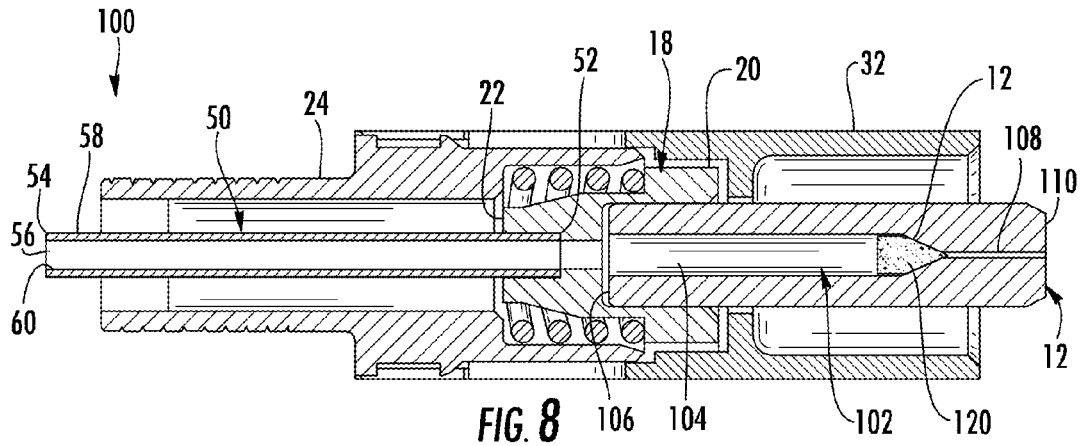
FIG. 8 is a cross-sectional view of a fiber optic connector according to another embodiment.

To this end, FIG. 8 illustrates an example of a fiber optic connector 100 ("connector 100") that includes the tube 50. Similar reference numbers are used to refer to similar elements from the connector 10 such that only the differences will be described. In the connector 100, the tube 50 extends from the second end portion 22 of the ferrule holder 18. The tube 50 may be press-fit within a passage of the ferrule holder 18 or secured to the ferrule holder 18 in any other manner. In some embodiments, the ferrule holder 18 may be molded over a portion of the tube 50. The same can be said with respect to the first end portion 20 of the ferrule holder 18 and the ferrule 12. Regardless of whether and how the tube 50 and ferrule 12 are secured to the ferrule holder 18, the tube 50 communicates with a ferrule bore 102 of the ferrule 12. That is, an open path is established between the tube 50 and the ferrule bore 102. In the embodiment shown, the tube 50 communicates with the ferrule bore 102 via a passage in the ferrule holder 18, but in alternative embodiments the tube 50 may extend through the ferrule holder 18 and directly into the ferrule bore 102.

The ferrule bore 102 is shown as having a first section 104 extending inwardly from a rear end 106 of the ferrule 12, a second section 108 (also referred to as "micro-hole" or "micro-hole section") extending inwardly from a front end 110 of the ferrule 12, and a transition section 112 located between the first section 104 and second section 108. The first section 104 has a first width, and the second section 108 has a second width less than the first width such that the transition section 112 provides a decrease in width between the first section 104 and second section 108. More specifically, in the embodiment shown, the first section 104 is a cylindrical bore extending from the rear end 106 of the ferrule 12 to the transition section 112 such that the first width is a first diameter. The second section 108 is a cylindrical bore extending from the front end 110 of the ferrule 12 to the transition section 112 such that the second width is a second diameter. Accordingly, the transition section 112 provides a decrease in diameter between the first section 104 and second section 108.

Still referring to FIG. 8, a bonding agent 120 (also referred to as an "adhesive composition") is at least partially located in the transition section 112 of the ferrule bore 102. The bonding agent 120 may be pre-loaded or stored within the ferrule 12 for a significant amount of time (e.g., at least an hour, a day, a year, etc.) before inserting an optical fiber into the ferrule bore 102. For example the bonding agent 120 may be pre-loaded into the ferrule bore 102 by the manufacturer of the ferrule 12. In these and other embodiments, the bonding agent 120 may be a solid material, such as a solid powder, configured to melt when heated above certain temperatures. The bonding agent 120 may therefore be an adhesive plug positioned within the transition section 112 of the ferrule bore 102, substantially blocking an entrance to the second section 108. Additional details about exemplary bonding agents are provided further below. First, however, an exemplary method of terminating a fiber optic cable with the connector 100 will be described, where the method involves both: a) removing a tight buffer coating of the fiber optic cable in a manner similar to the techniques already mentioned above, and b) removing a primary coating of the fiber optic cable by heating the bonding agent 120 to an elevated temperature that is sufficient to change the primary coating to a non-solid state.

The method is generally shown in FIGS. 9-16. As with the method described in connection with FIGS. 4-7, the end section 48 of the optical fiber 40 with the primary coating 42 and tight buffer coating 44 still present is positioned next to second end 54 of the tube 50. The tube 50 extends from the second end portion 22 of the ferrule holder 18 to beyond the housing 24 of the connector 100 in this in embodiment, but in other embodiments may only extend to an end of the housing 24 or may even be recessed within the housing 24. Also like the method described in connection with FIGS. 4-7, energy is applied to heat the tight buffer coating 44 (e.g., between about 60° C. and about 200° C.). The energy source or heating device 70 is once again shown generically because different embodiments may use different sources and techniques to heat the tight buffer coating 44 directly or indirectly.

The method shown in FIGS. 9-16 also involves applying energy to heat the bonding agent 120. To this end, the connector 100 may be configured to be used in conjunction with a heating system that focuses heat onto the ferrule 12 in such a way that the bonding agent 120 is heated to a non-solid state (i.e., melted). The heating system may even serve as the energy source 70 in some embodiments such that energy is applied to the connector 100 only once and/or only by the same system. In such embodiments, the tight buffer coating 44 may be heated by allowing heat to propagate to the tube 50 when applying energy to heat the bonding agent 120. The bonding agent 120 may be heated to a significantly higher temperature than the tube (e.g., 100° C. or more higher) to facilitate such propagation. In other other embodiments, separate heating devices may be used to apply energy to heat the tight buffer coating 44 and bonding agent 120. Although a particular heating system for heating the bonding agent 120 will now be described, other heating systems and techniques may be used in alternative embodiments.

Figure 9:
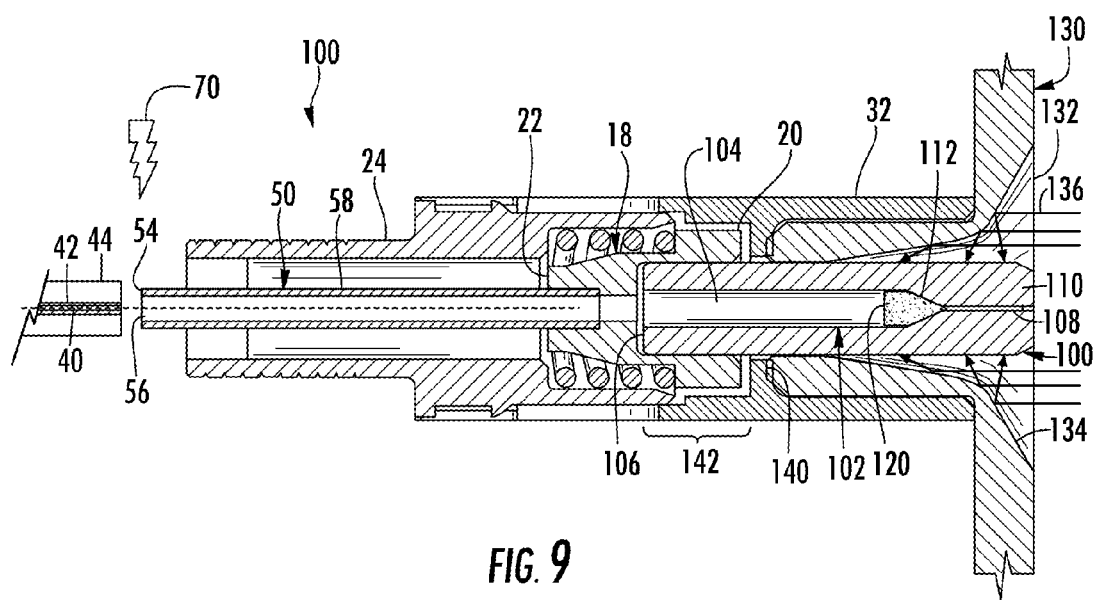
FIG. 9 is a cross-sectional view similar to FIG. 8, but showing energy being applied to heat the tight buffer coating of a fiber optic cable and energy being applied to heat a bonding agent in a ferrule of the fiber optic connector.

With this in mind, FIG. 9 illustrates the ferrule 12 being supported by a heating port 130 that includes an opening 132 and a reflector 134 surrounding the opening 132. The reflector 134 includes angled reflective surfaces that are positioned relative to the the ferrule 12 to focus heat onto a portion of the the ferrule 12 to melt the bonding agent 120. For example, the heating may be accomplished by $CO_2$ laser beams 136 that are focused by the reflector 44 onto a portion of the ferrule 12 that includes the bonding agent 120 and potentially onto the second section 108 of the ferrule bore 102. This portion of the ferrule 12 may be a front half or a front third of the ferrule 12 in some embodiments. In this manner, the bonding agent 120 may be melted while the heating of other areas of the ferrule 12 (e.g., a rear half or rear third of the ferrule 12) is limited to avoid reaching a temperature high enough to damage the outer housing 32 and/or inner housing 24 (yet still allow sufficient heat propagation to the tube, if desired). Specific examples of heating will now be described to further illustrate this aspect.

In some embodiments, during heating, the portion of the ferrule 12 including the bonding agent 120 (and the bonding agent 120 itself) is heated to a temperature above 250° C. while the temperature of the rear end 106 of the ferule 12, the ferrule holder 18, the inner housing 24, and/or the outer housing 32 remain below 250° C., or even below 200° C. A more specific example involves heating the portion of the ferrule 12 including the bonding agent 120 (and the bonding agent 120 itself) to a temperature in the range of 250-400° C. while the temperature of the rear end 106 of the ferule 12, the ferrule holder 18, the inner housing 24, and/or the outer housing 32 remains below 250° C., or even below 200° C. An even more specific example involves heating the portion of the ferrule 12 including the bonding agent 120 (and the bonding agent 120 itself) to a temperature in the range of 280-360° C. while the temperature of the rear end 106 of the ferrule 12, the ferrule holder 18, the inner housing 24, and/or the outer housing 32 remains below 250° C., or even below 200° C. The melting temperature of the bonding agent 120 may fall within the temperature range to which the ferrule 12 is heated, as may a temperature at which the bonding agent 120 cross-links (discussed below) in the presence of air. In some embodiments, the bonding agent 120 may be heated above its melting temperature but below the temperature at which the bonding agent 120 cross-links in the presence of air. For example, a bonding agent with a melting temperature of about 270° C. (or less) and a cross-linking temperature of about 330° C. (or greater) may be heated to a temperature in the range of about 280-300° C. Regardless, and as mentioned above, keeping the rear end 106 of the ferrule 12 at a lower temperature than the portion including the bonding agent 120 reduces the likelihood of damaging other nearby components of the connector 10, such as the outer housing 32 and/or inner housing 24.

Examples of illustrating this aspect can be expressed in even further detail by referring to more than simply the rear end 106 of the ferrule 12. For example, in the embodiment shown, the outer housing 32 includes a clamping member 140. The ferrule 12 includes an inner portion 142 located inward from clamping member 140 within the outer housing 32. In FIG. 9, the inner portion 142 of the ferrule 12 is the portion of the ferrule 12 located to the left of the clamping member 140. During heating and melting of the bonding agent 120, the inner portion 142 of the ferrule 12 may be maintained below a temperature that might damage the outer housing 32 and inner housing 32, and below the temperature to which the bonding agent 120 is heated. Thus, during heating, the portion of the ferrule 12 including the bonding agent 120 (and the bonding agent 120 itself) may be heated to a temperature above 250° C. while the temperature of the inner portion 142 of the ferrule 12 remains below 250° C., or even below 200° C. In embodiments where the portion of the ferrule 12 including the bonding agent 120 (and the bonding agent 120 itself) is heated to a temperature in the range of 250-400° C. (or 280-360° C. in some embodiments, or even more specifically 340-360° C. in some embodiments), the inner portion 142 of the ferrule 12 may remain below 250° C., or even below 200° C.

Advantageously, the larger diameter of first section 104 (compared to the smaller diameter of second section 108) results in a large portion of the volume of the ferrule 12 being filled with air, and the air within the ferrule 12 may act as a buffer or insulator to heat transfer along the length of the ferrule 12. Thus, the insulating effect of the air within the first section 104 may contribute to maintaining the inner portion 142 of the ferrule 12 at a low temperature during heating, as discussed above. It should be understood that the temperature to which the portion of the ferrule 12 including the bonding agent 120 is heated may be based upon the melting, cross-linking, and/or curing temperature of the particular bonding agent located within in the ferrule 12. Alternatively or additionally, the bonding agent 120 may be heated above a delamination temperature, melting temperature, oxidation temperature, ablation temperature, or other thermal degradation temperature of the primary coating 42.

Figure 10:
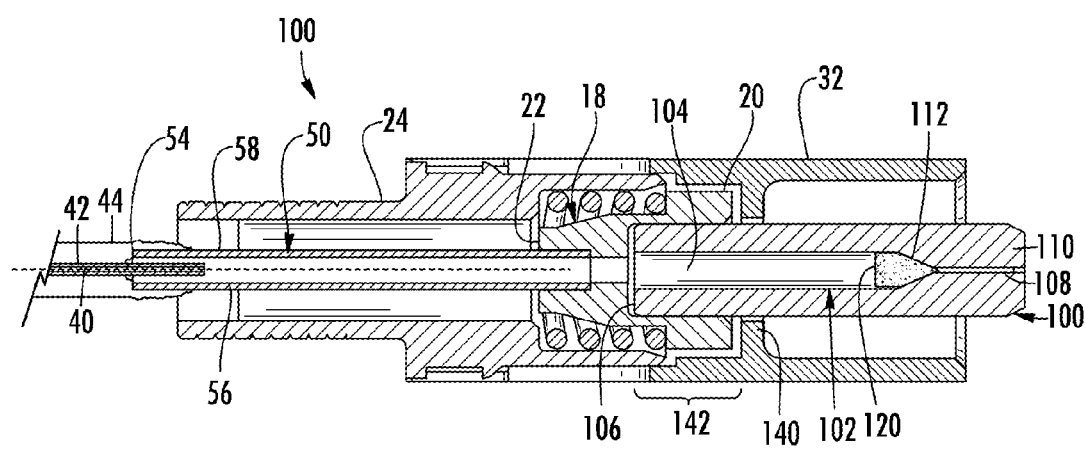
FIG. 10 is a cross-sectional view similar to FIG. 9, but showing an end section of an optical fiber being inserted into a tube of the fiber optic connector to remove a tight buffer coating from a primary coating that surrounds the optical fiber.
Figure 11:
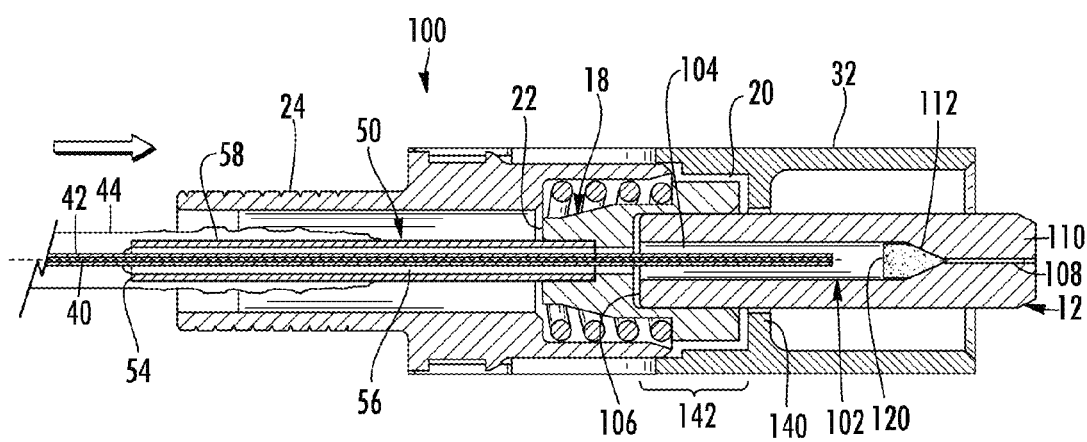
FIG. 11 is a cross-sectional view similar to FIG. 10, but showing the end section of the optical fiber extending through the tube and into a ferrule bore of the ferrule.
Figure 12:
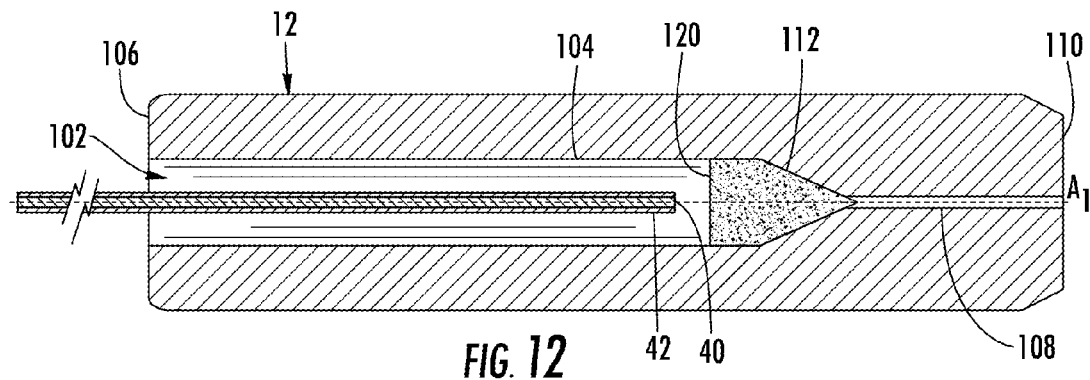
FIG. 12 is a more detailed view of a portion of FIG. 11 showing the ferrule and optical fiber in isolation.

Referring to FIGS. 10-12, once the tight buffer coating 44 (or tube 50) and bonding agent 120 have been heated, the end section 48 of the optical fiber 40 is inserted into the tube 50. As mentioned above in connection with FIGS. 4-7, the tight buffer coating 44 contacts the second end 54 of the tube 50 upon this insertion, separates from the primary coating 42, and moves over the outer surface 58 of the tube 50 as the optical fiber 40 is advanced (again, manually or automatically). Eventually the optical fiber 40—with the primary coating 42 still present—is advanced through the tube 50 and ferrule holder 18 so as to extend into the ferrule bore 102. FIGS. 11 and 12 illustrate the optical fiber 40 within the first section 104 of the ferrule bore 102 before encountering the bonding agent 120, which at this point is a flowable adhesive material because of the heating mentioned above.

Figure 13:
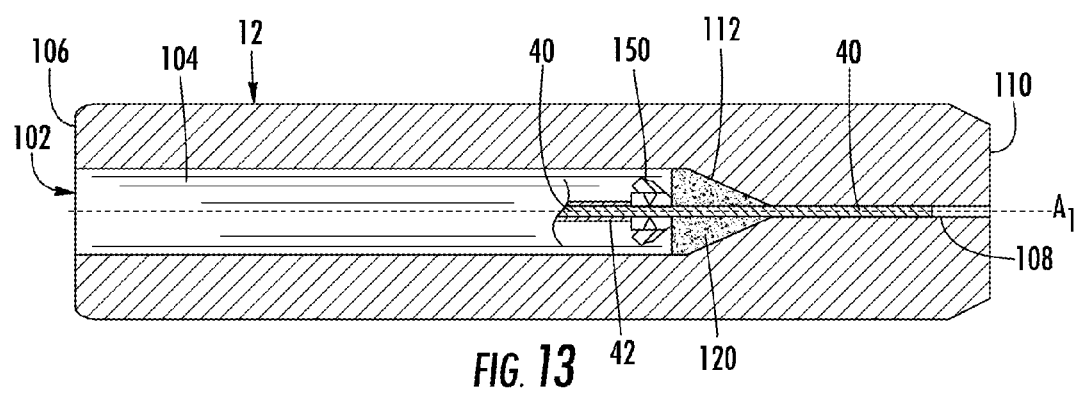
FIG. 13 is a cross-sectional view similar to FIG. 12, but showing the optical fiber being inserted through the heated bonding agent in the ferrule.
Figure 14:
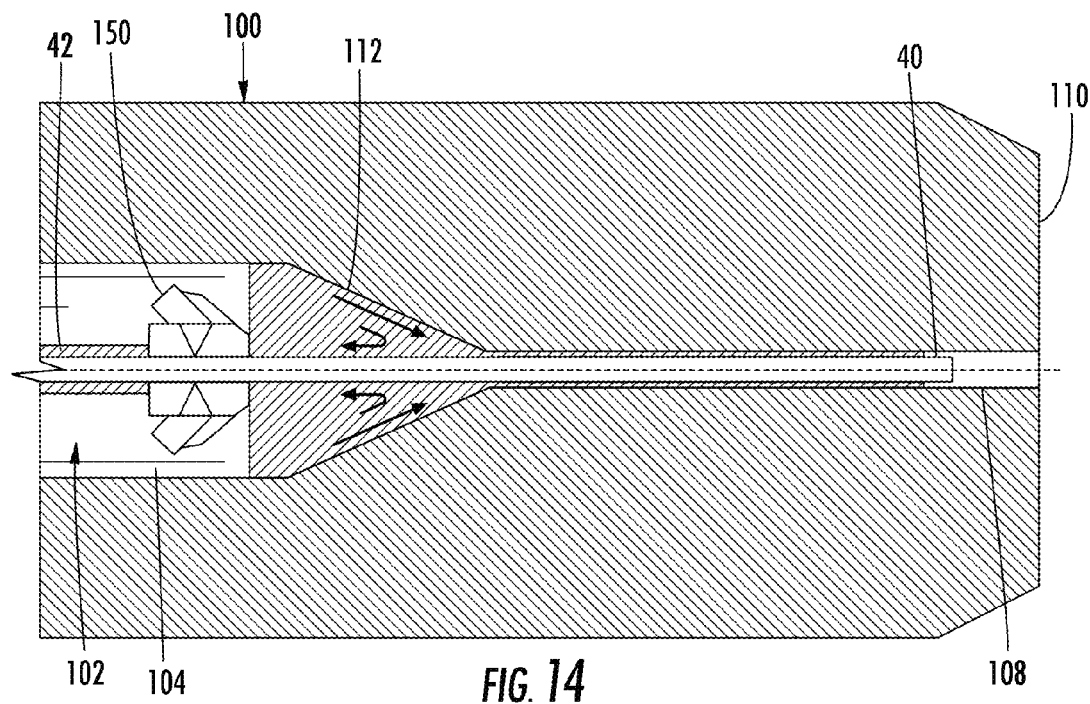
FIG. 14 is a more detailed view of a portion of FIG. 13.

As shown in FIGS. 13 and 14, the optical fiber 40 may be advanced further to pass through the bonding agent 120 so that the bonding agent 120 thermally removes the primary coating 42 from the optical fiber 40. As used herein, the phrase "thermally removes" or "thermally removed" refers to heat from the bonding agent 120 and/or ferrule 12 causing the primary coating 42 to at least partially separate or otherwise become free from the optical fiber 40. The primary coating 42 may, for example, be partially converted to a gas, oxidized, melted, and/or simply pushed backwards on the optical fiber 40. The thermal removal of the primary coating 42 at least partially exposes the end section 48 of the optical fiber 40 to the bonding agent 120, thereby allowing the optical fiber 40 to pull at least some of the bonding agent 120 into the second section 108 of the ferrule bore 102.

The inner diameter of the second section 108 of the ferrule bore 102 being smaller than the outer diameter of the primary coating 42 may facilitate the primary coating 42 being pushed away from the end section 48 during the insertion of the optical fiber 40. In the embodiment shown, some of the primary coating 42 that has been thermally removed from the optical fiber 40 accumulates to form a support body 150 that may provide protection from potentially harmful bending of the optical fiber 40. The support body 150 may be located within the ferrule 12 to help prevent the support body 150 from interfering with the design of the connector 100. Therefore, providing the ferrule bore 102 with a first section 104 that has a larger diameter not only allows for advantageous heating of the ferrule 12 (discussed above), but also allows for advantageous placement/capture of thermally removed material. These advantages apply even if the thermally removed material does not form a support body 150 or otherwise provide protection from bending of the optical fiber 40.

Still referring to FIGS. 13 and 14, it can be seen how the optical fiber 40 enters the second section 108 of the ferrule bore 102 after insertion through the bonding agent 120 and after thermal removal of the primary coating 42. As mentioned above, the end section 48 of the optical fiber 40 pulls at least some of the bonding agent 120 into the second section 108 of the ferrule bore 102. The shape of the transition section 112 may facilitate this aspect, particularly when the transition section 112 includes a frustoconical inner surface, by acting as a funnel and directing the bonding agent 120 into the second section 108 of the ferrule bore 102 along with the end section 48 of the optical fiber 40. Providing geometry to facilitate the desired fluid dynamics is particularly beneficial for the design of the ferrule 12 because of the reduced length of the second section 108 compared to the ferrule bore 102 as a whole, which means that there is less overall surface area available for the bonding agent 120 to secure the end section 48 of the optical fiber 40. More effectively filling any space between the end section 48 of the optical fiber 40 and the inner surface of the second section 108 may promote more effective bonding.

Figure 15:
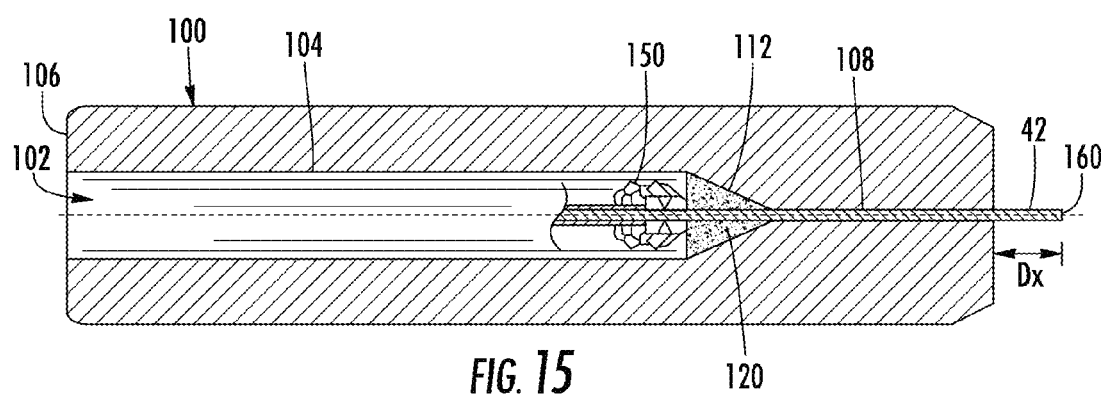
FIG. 15 is a cross-sectional view similar to FIG. 12, but showing the end section of the optical fiber being inserted completely through the ferrule so that a terminal end of the optical fiber extends past an endface of the ferrule.
Figure 16:
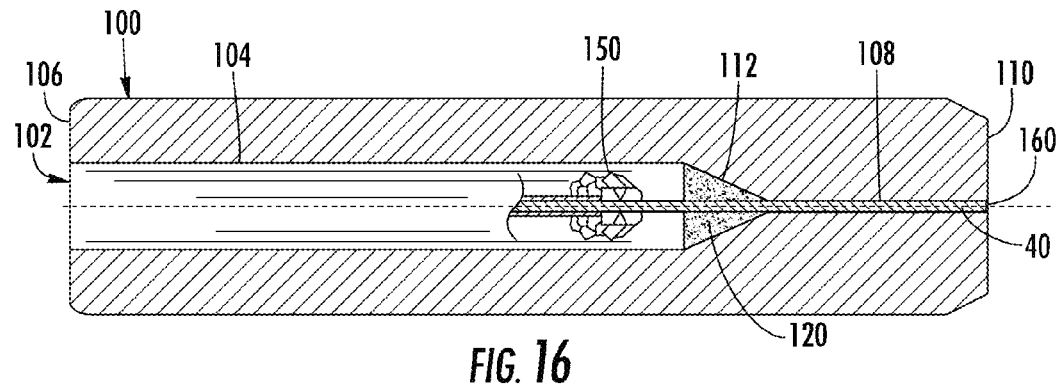
FIG. 16 is a cross-sectional view similar to FIG. 12, but showing the terminal end of the optical fiber being positioned proximate the endface of the ferrule.

Additionally or alternatively, the optical fiber 40 may inserted into the ferrule bore 102 and through the bonding agent 120 in a particular manner to promote bonding with the section section 108 of the ferrule bore 102. For example, FIGS. 15 and 16 illustrate the end section 48 of the optical fiber 40 being inserted completely through the ferrule bore 102 so that a terminal end 160 of the optical fiber 40 extends a distance $D_x$ past the front end 110 of the ferrule 12 (FIG. 15), and thereafter retracting the optical fiber 40 to bring the terminal end 160 proximate the front end 110 of the ferrule 12 (FIG. 16). The distance $D_x$ may be, for example, at least 0.5 mm, at least 1 mm, at least 2 mm, or even at least 5 mm in some embodiments to ensure that a sufficient amount of the bonding agent 120 is drawn into the second section 108 of the ferrule bore 102 and/or to ensure that a sufficient amount of the primary coating 42 is thermally removed from the portion of the optical fiber 40 that is ultimately located within the second section 108. In these and other embodiments, the optical fiber 40 and/or ferrule 12 may be rotated during insertion of the optical fiber 40 to further promote thermal removal of the primary coating 42 and/or drawing the bonding agent 120 into the second section 108 of the ferrule bore 102.

The final position of the terminal end 160 of the optical fiber 40 in relation to the front end 110 of the ferrule 12, regardless of whether the optical fiber 40 is inserted a distance $D_x$ past the front end 110 of the ferrule 12 and retracted, may depend upon whether further processing steps are desired. For example, a terminal end 160 of the optical fiber 40 may be made flush with (or substantially flush with, such as within 20 μm or even within 10 μm) the endface defined by the front end 110 of the ferrule 12, which may be the case if the optical fiber 40 is cleaved and/or polished prior to insertion into the ferrule bore 102. Alternatively, the terminal end 160 of the optical fiber 40 may be left protruding from the endface of the ferrule (e.g., by about 20-50 μm or more), which may be the case if the optical fiber 40 is intended to be cleaved and/or conventionally polished after being secured in the ferrule bore 102.

The bonding agent bonds the optical fiber 40 to the inner surface of the second section 108 of the ferrule bore 102 upon cooling to form a fiber optic cable assembly. Note that the ferrule 12 may be actively cooled, for example by blowing air, to speed the cooling and solidification process. In other embodiments, the ferrule 12 may be passively cooled, for example by simply allowing the ferrule 12 and the flowable adhesive material to return to a temperature at which the bonding agent 120 solidifies. Additional processing steps to finish the cable assembly (e.g., polishing) may be performed following solidification if necessary.

Figure 17:
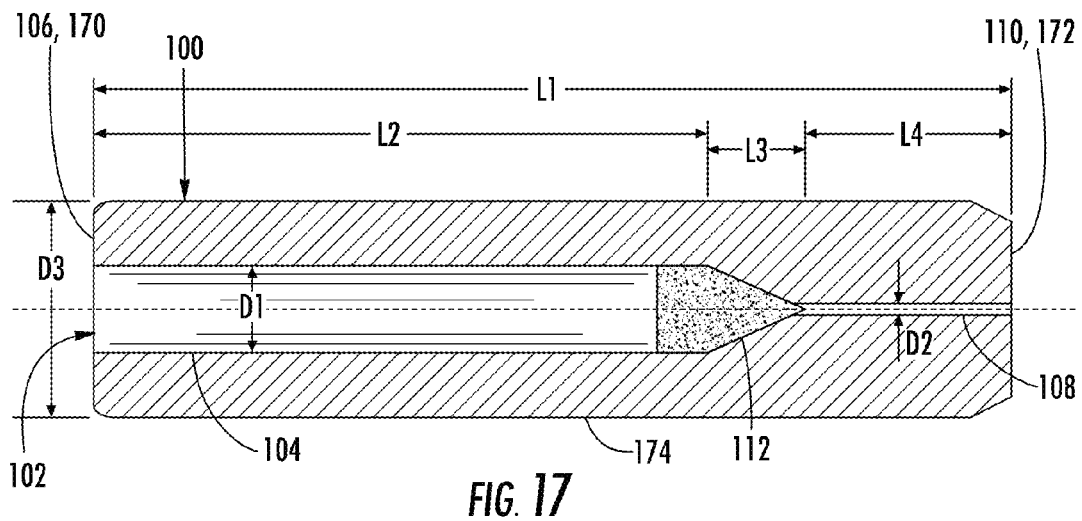
FIG. 17 is a cross-sectional view showing the ferrule of the fiber optic connector of FIG. 8 in isolation, prior to be heated.

Having described how the design of the ferrule 12 generally facilitates removing the primary coating when using the techniques described above, additional details of the ferrule 12 will now be provided. As shown in FIG. 17, the rear end 106 and front end 110 of the ferrule 12 define respective endfaces 170, 172 extending in planes that are parallel or substantially parallel to each other. In other embodiments, the endfaces 170, 172 may extend in planes at an angle to each other and/or be non-planar surfaces, such as convex or concave surfaces. The first diameter of the first section 104 of the ferrule bore 102 is shown as D1, and the second diameter of the second section 108 is shown as D2. The ferrule 12 is substantially cylindrical with an outer surface 174 having an outer diameter D3. In other embodiments, the first section 104, section section 108, and outer surface 174 may have non-circular cross-sectional shapes (e.g., elliptical, square, rectangular, triangular, etc.), and in such embodiments the first section 104, section section 108, and outer surface 174 may have widths that substantially match the various embodiments of D1, D2 and D3 discussed herein.

In addition to the benefits already mentioned above, the larger nature of the first diameter D1 may allow for the easy or efficient insertion of the bonding agent 120 into the ferrule bore 102 to form an adhesive plug. The first diameter D1 may be defined in relation to the second diameter D2 and/or outer diameter D3 to provide these benefits. For example, D1 may be between 20% and 80% of D3, between 20% and 60% of D3, or between 30% and 50% of D3. In one specific embodiment, D1 may be about 40% of D3. Alternatively or additionally, D1 may be greater than twice D2, greater than four times D2, or between 7 and 9 times D2.

The transition section 112 of the ferrule bore 102 has a decreasing diameter from left to right in the orientation of FIG. 17 (e.g., the diameter of the transition section 112 decreases as the distance to the front end 110 decreases). In the embodiment shown, the transition section 112 is a frustoconical-shaped section having an inner surface positioned at an angle A relative to the longitudinal axis $A_1$ of the ferrule bore 102. In various embodiments, angle A may be between 30° and 80°, or specifically between 50° and 70°, and even more specifically be about 60°.

Although FIG. 17 shows the transition section 112 of the ferrule bore 102 as a frustoconical, tapered section having a diameter that is proportional (e.g., linearly related) to the distance to the endface 172, in other embodiments the inner surface may have other shapes that generally have variable widths/diameters to provide a decrease in width/diameter as the distance to the front end 110/endface 172 decreases. For example, the inner surface may include steps of decreasing diameter or may be a surface having a continuously curved but nonlinear relation to the distance to the endface 172. As noted above, the decreasing diameter of the transition section 112 helps funnel melted adhesive material into the second end section 108 of the ferrule bore 102 and also acts to guide the end section 48 of the optical fiber 40 into the second section 108 during insertion.

The relative lengths of the ferrule 12, first section 104, second section 108, and transition section 112 may further contribute to the functionalities discussed herein. For example, the relative lengths may structurally allow for the placement of the bonding agent 120 adjacent the second section 108. As discussed above, such placement may allow the ferrule 12 to be heated to melt the bonding agent 120 while limiting heating of an inner portion 142 of the ferrule 12.

FIG. 17 illustrates the ferrule 12 having an axial length L1, the first section 104 of the ferrule bore 102 having an axial length L2, the transition section 112 having an axial length L3, and the second section 108 having an axial length L4. L2 is greater than L3 and L4, and L4 is greater than L3. In some embodiments, L2 may be greater than 50% of L1, greater than 55% of or even greater than 60% of L1. L2 may be, for example, between 50% and 70% of L1. In these or other embodiments embodiments, L4 may be less than 40% of L1, less than a third of or even less than 30% of L1. L4 may be, for example, between 20% and 40% of L1. Also in these or other embodiments, L3 may be less than 30% of L1, less than 20% of L1, or even less than 10% of L1. L3 may be, for example, between 5% and 15% of L1.

The bonding agent 120, which is shown in FIG. 17 in a solid state (i.e., as an adhesive plug), is primarily located within the transition section 112 but may also have a small portion extending into the second section 108. Further, in the embodiment shown, all of the bonding agent 120 is located within the ferrule bore 102 between an axial midpoint and the front end 110. Prior to melting the bonding agent 120, at least 80%, or at least 90%, or even further, at least 95% of the bonding agent 120 may be located between the axial midpoint and the second section 108 (i.e., the end of the transition section 112). And in various embodiments, more than 50% of the bonding agent 120 may be located within the transition section 112.

The transition section 112 and first section 104 of the ferrule bore 102 provide a storage area for the bonding agent 120 prior to heating and flowing into second section 108. Indeed, the bonding agent 120 may include particles or pellets of adhesive material having an average diameter sufficiently large compared to the second diameter of the second section 108 such that placement of the adhesive material into the second section 108 prior to melting is not practical. For example, in certain embodiments, the average diameter of adhesive particles of the adhesive material may be greater than 25% of D2, greater than 50% of D2, or even greater than 75% of D2.

As mentioned above, the ferrule 12 may be pre-loaded with the bonding agent 120 at a time and/or location distant from the time and place of securing the optical fiber 40 within the ferrule 12. For example, the bonding agent 120 may be loaded into the ferrule 12 at a first physical location or facility (e.g., a ferrule manufacturing facility). The ferrule 12 pre-loaded with the bonding agent 120 may then be shipped to a second physical location or facility that couples the ferrule 12 to an optical fiber. Thus, the bonding agent 120 remains within the ferrule 12 as an adhesive plug during handling, shipping, packaging, etc. The bonding agent 120 may be, for example, a solid powder material that is coupled within the transition section 112 via compression (i.e., packed into the transition section 112 to form an adhesive plug). Alternatively, the bonding agent 120 may be extruded or injection molded into the transition section 112 to form an adhesive plug. The ferrule 12 may contain the bonding agent 120 for a long period of time before heating, such as 8 hours, 16 hours, 1 day, 1 week, 1 month, 6 months, 1 year, or even several years.

Now that additional details and examples of the ferrule 12 have been described, additional details and examples of the bonding agent 120 will be provided. As can be appreciated, a bonding agent that heats and cools quickly may help reduce the overall time associated with the methods disclosed herein. The bonding agent should, however, also provide sufficient coupling between the end section 48 of the optical fiber 40 and the second section 108 of the ferrule bore 102. One specific example of such a bonding agent is one that comprises a partially cross-linked polymer resin and a coupling agent that provides chemical coupling between the polymer resin and the optical fiber 40, the ferrule 12, or both. The presence of the coupling agent allows the polymer resin to be selected primarily for heating and cooling properties rather than adhesion properties. The bonding agent may even comprise a majority of the polymer resin so as to be largely characterized by the heating and cooling properties of the polymer resin. For example, the bonding agent may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated. Following heating, the polymer resin may be partially cross-linked.

One example of a partially cross-linked polymer resin with the desired heating and cooling characteristics mentioned above includes poly(phenylene sulfide). One example of a coupling agent having the desired adhesion characteristics mentioned above is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linked polymers, coupling agents, and bonding agents in general are described in U.S. Pat. No. 8,696,215, the disclosure of which (and particularly the examples of bonding agents/adhesive compositions) is incorporated herein by reference.

Persons skilled in optical connectivity will appreciate additional variations and modifications of the elements disclosed herein. For example, although the design of the ferrule 12 for the connector 100 may provide some unique advantages, other designs are possible that still allow for thermally removing the primary coating on an optical fiber using the methods disclosed herein. The ferrule bore 102 may, for example, may have a uniform diameter or may only have a transition section at the rear end of the ferrule 12 (i.e., the remainder of the ferrule bore 102 being a micro-hole).

Persons skilled in optical connectivity will also appreciate variations and modifications of the methods involving the elements disclosed herein, including the order in which the method steps are performed. For example, energy may be applied to heat the bonding agent 120 after inserting the optical fiber 40 into or through the tube 50 and removing some of the tight buffer coating 44. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A method of removing a buffer coating from an optical fiber, wherein the buffer coating surrounds a primary coating on the optical fiber, the method comprising:
    positioning an end section of the optical fiber next to an end of a tube, wherein at least a portion of the end section of the optical fiber includes the primary coating and the buffer coating, and further wherein the tube has an inner diameter greater than an outer diameter of the primary coating and an outer diameter less than an outer diameter of the buffer coating;
    applying energy to heat the buffer coating;
    inserting the end section of the optical fiber into the tube so that the buffer coating contacts the end of the tube; and
    advancing the end section of the optical fiber along the tube, wherein the tube removes the buffer coating from the primary coating as the end section of the optical fiber is advanced;
    wherein the tube is part of a fiber optic connector that also includes a ferrule having a front end, a rear end, a ferrule bore extending between the front and rear ends, and a bonding agent disposed in at least a portion of the ferrule bore, the method further comprising:
        applying energy to heat the bonding agent;
        advancing the end section of the optical fiber through the tube, into the ferrule bore, and through the bonding agent when the bonding agent is heated, wherein the heated bonding agent thermally removes at least a portion of the primary coating when the end section of the optical fiber passes through the bonding agent; and
        securing the optical fiber in the ferrule bore with the bonding agent.

2. The method of claim 1, wherein applying energy to heat the buffer coating comprises:

heating the tube such that the buffer coating is heated indirectly via contact with the tube.

3. The method of claim 1, wherein applying energy to heat the buffer coating comprises:
   directing heat toward the buffer coating with a heating device.

4. The method of claim 1, wherein the buffer coating is heated to a temperature between about 60° C. and about 200° C.

5. The method of claim 1, wherein the inner diameter of the tube is between about 120% and about 170% of the outer diameter of the primary coating.

6. The method of claim 1, wherein the outer diameter of the tube is between about 50% and about 70% of the outer diameter of the buffer coating.

7. The method of claim 1, wherein the buffer coating removed from the primary coating moves over an outer surface of the tube as the end section of the optical fiber is advanced along the tube, and further wherein the outer surface of the tube includes at least one retention feature configured to resist retraction of the buffer coating.

8. The method of claim 1, wherein the buffer coating removed from the primary coating moves over an outer surface of the tube as the end section of the optical fiber is advanced along the tube, and further wherein the outer surface of the tube includes at least one removal feature at or near the end of the tube to facilitate removal of the buffer coating.

9. The method of claim 1, wherein the end section of the optical fiber is manually advanced along the tube.

10. The method of claim 1, wherein the end section of the optical fiber is advanced through the tube so that a length of the end section with the primary coating is exposed, the method further comprising:
    removing the primary coating from the end section of the optical fiber; and
    terminating the optical fiber with a fiber optic connector.

11. The method of claim 1, wherein:
    the ferrule bore includes a first section extending inwardly from the rear end of the ferrule and having a first width, a second section extending inwardly from the front end of the ferrule and having a second width that is less than the first width, and a transition section located between the first section and the second section;
    the bonding agent is at least partially located in the transition section;
    the end section of the optical fiber is at least partially exposed to the bonding agent after thermally removing at least a portion of the primary coating from the end section; and
    the end section of the optical fiber pulls at least some of the bonding agent into the second section of the ferrule bore when the end section is passed through the bonding agent.

12. The method of claim 1, wherein applying energy to heat the buffer coating comprises allowing heat to propagate to the tube when applying energy to heat the bonding agent such that the applying energy steps are the same.

13. The method of claim 1, wherein separate heating devices are used to apply energy to heat the buffer coating and to heat the bonding agent.

* * * * *